United States Patent
Nakahara et al.

(10) Patent No.: US 10,880,404 B2
(45) Date of Patent: Dec. 29, 2020

(54) ON-VEHICLE CONTROL DEVICE AND ON-VEHICLE CONTROL DEVICE INFORMATION UPDATE SYSTEM

(71) Applicant: Hitachi Automotive Systems, Ltd., Hitachinaka (JP)

(72) Inventors: Fumiharu Nakahara, Ibaraki (JP); Kenichi Kurosawa, Ibaraki (JP); Hidetoshi Teraoka, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 67 days.

(21) Appl. No.: 15/740,193

(22) PCT Filed: Aug. 5, 2016

(86) PCT No.: PCT/JP2016/073025
§ 371 (c)(1),
(2) Date: Dec. 27, 2017

(87) PCT Pub. No.: WO2017/056721
PCT Pub. Date: Apr. 6, 2017

(65) Prior Publication Data
US 2018/0191866 A1     Jul. 5, 2018

(30) Foreign Application Priority Data

Sep. 29, 2015   (JP) ................. 2015-190606

(51) Int. Cl.
*H04L 29/08* (2006.01)
*B60R 16/023* (2006.01)
(Continued)

(52) U.S. Cl.
CPC .......... *H04L 67/34* (2013.01); *B60R 16/0231* (2013.01); *G06F 8/65* (2013.01);
(Continued)

(58) Field of Classification Search
CPC ........... H04L 63/34; H04L 2012/40273; H04L 12/40039; B60R 16/0231; G06F 8/65
See application file for complete search history.

(56) References Cited

U.S. PATENT DOCUMENTS

2003/0009271 A1* 1/2003 Akiyama ................ H04L 67/12
701/29.6
2007/0100513 A1* 5/2007 Asano .................. G08G 1/0104
701/2
(Continued)

FOREIGN PATENT DOCUMENTS

| JP | 2009-110529 A | 5/2009 |
| JP | 2011-27962 A | 2/2011 |
| WO | WO 2005/059862 A1 | 6/2005 |

OTHER PUBLICATIONS

International Search Report (PCT/ISA/210) issued in PCT Application No. PCT/JP2016/073025 dated Nov. 8, 2016 with English-language translation (Five (5) pages).
(Continued)

*Primary Examiner* — Sargon N Nano
*Assistant Examiner* — Christopher B Robinson
(74) *Attorney, Agent, or Firm* — Crowell & Moring LLP

(57) ABSTRACT

Provided are an on-vehicle control device and an on-vehicle control device information update system that are capable of identifying a subject vehicle by a simple means, while suppressing power consumption, when on-vehicle device information is automatically updated. This on-vehicle control device receives a vehicle response request message from a data server in a power-saving mode in which only a vehicle external communication unit can operate; checks vehicle identification information and on-vehicle control device information that are subject to change and are stored in the message, and vehicle identification information and on-vehicle control device information stored in advance in the vehicle external communication unit and responds with the results to the data server.

18 Claims, 9 Drawing Sheets

(51) Int. Cl.
*H04L 12/40* (2006.01)
*G06F 8/65* (2018.01)
*H04L 12/12* (2006.01)

(52) U.S. Cl.
CPC ........ *H04L 12/12* (2013.01); *H04L 12/40039* (2013.01); *H04L 2012/40273* (2013.01); *Y02D 10/00* (2018.01); *Y02D 30/50* (2020.08)

(56) References Cited

U.S. PATENT DOCUMENTS

| | | | |
|---|---|---|---|
| 2008/0219274 A1* | 9/2008 | Kato | H04L 67/12 370/401 |
| 2012/0262110 A1* | 10/2012 | Soong | H02J 7/04 320/109 |
| 2013/0031540 A1* | 1/2013 | Throop | G06F 8/654 717/173 |
| 2014/0047255 A1* | 2/2014 | Sasaki | H04L 41/06 713/323 |
| 2014/0149644 A1* | 5/2014 | Park | G06F 8/654 711/103 |
| 2015/0039877 A1* | 2/2015 | Hall | G06F 1/32 713/2 |
| 2017/0129425 A1* | 5/2017 | Dalke | B60R 25/2018 |

OTHER PUBLICATIONS

Japanese-language Written Opinion (PCT/ISA/237) issued in PCT Application No. PCT/JP2016/073025 dated Nov. 8, 2016 (Four (4) pages).

\* cited by examiner

FIG. 2

VEHICLE A

| VEHICLE MANUFACTURER | ○○○○ | |
|---|---|---|
| TYPE OF VEHICLE | □□□ | |
| MODEL | SZR22 | |
| MODEL YEAR | 2014 | |
| VEHICLE IDENTIFICATION NUMBER | JPNXYZ0000123456 | |
| SIM NUMBER | 080-XXXX-XXXX | |
| ON-VEHICLE CONTROL DEVICE a | MANAGEMENT NUMBER | XYZ-0001 |
| | SOFTWARE MANAGEMENT NUMBER | XYZ-SW0001 |
| | SOFTWARE VERSION | V0101 |
| | UPDATE DATE | 2014.X.XX |
| ON-VEHICLE CONTROL DEVICE b | MANAGEMENT NUMBER | XYZ-0002 |
| | SOFTWARE MANAGEMENT NUMBER | XYZ-SW0002 |
| | SOFTWARE VERSION | V0100 |
| | UPDATE DATE | 2014.X.YY |
| ⋮ | ⋮ | |
| AREA INFORMATION | △△△ HARBOR | |
| USER INFORMATION | USER NAME | |
| | ADDRESS | |
| | Tel | |
| | Mail | |
| UPDATE HISTORY | | |

*FIG. 8*

| VEHICLE IDENTIFICATION INFORMATION | JPNXYZ0000123456 | |
|---|---|---|
| ON-VEHICLE CONTROL DEVICE 1 | CAN ID | 0001 |
| | MANAGEMENT NUMBER | XYZ-0001 |
| | SOFTWARE MANAGEMENT NUMBER | XYZ-SW0001 |
| | SOFTWARE VERSION | V0101 |
| ON-VEHICLE CONTROL DEVICE 2 | CAN ID | 0002 |
| | MANAGEMENT NUMBER | XYZ-0002 |
| | SOFTWARE MANAGEMENT NUMBER | XYZ-SW0002 |
| | SOFTWARE VERSION | V0100 |
| ⋮ | ⋮ | ⋮ |

ON-VEHICLE CONTROL DEVICE AND ON-VEHICLE CONTROL DEVICE INFORMATION UPDATE SYSTEM

TECHNICAL FIELD

The present invention relates to an on-vehicle control device and an on-vehicle control device information update system.

BACKGROUND ART

In the related art, information of an on-vehicle control device (an intrinsic program according to the type of vehicle or data necessary for controlling a vehicle) is updated for each device by connecting an external device dedicated to update to on-board diagnostics (OED) connector mounted on the vehicle by a worker.

In addition, a method is proposed in which a data server managed by a vehicle manufacturer, a dealer, and the like and the vehicle under the management of the data server are connected to each other through wireless communication, and a program and data of an on-vehicle control device of an update subject vehicle are automatically updated according to an instruction from the data server, and thus, the update can be efficiently performed without bothering the worker (for example, PTL 1).

CITATION LIST

Patent Literature

PTL 1: International Publication No. WO 2005/059862 A

SUMMARY OF INVENTION

Technical Problem

However, in the method of automatically updating the on-vehicle control device through the wireless communication as described above, it is necessary that the data server specifies a vehicle or an on-vehicle control device, which is an update subject, and confirms whether or not it is in a state where the update can be performed, before the update. This is because there is a concern that in a case where a vehicle or an on-vehicle control device, which is not the subject, is erroneously updated, the function of the vehicle failed, or in the worst case, the vehicle itself is not operated.

In PTL 1, means is adopted in which the vehicle is woken up from a sleep state according to an update request from the data server, and the on-vehicle control device, which is the update subject, is selected according to a response from the woken vehicle, and it is confirmed whether or not the woken vehicle is in a situation where the update can be performed.

However, in the means of PTL 1, in order to confirm the presence or absence of the on-vehicle control device, which is the update subject, or whether or not the vehicle is in the state where the update can be performed, it is necessary to wake up the vehicle, and the control becomes complicated. Further, in PTL 1, a battery residual amount of the vehicle is not considered, and thus, a data amount of update information received from the data server increases, and in the case of consuming great deal of power at the time of receiving or updating data, there is a concern that the information is not capable of being normally updated due to an insufficient residual amount of an operation power source.

Solution to Problem

The present invention has been made in order to solve the problems described above, and in the present invention, an on-vehicle control device includes a power-saving mode in which only transmission and reception with respect to a data server can be performed, and a normal mode in which communication with respect to other on-vehicle control devices connected through a vehicle internal network can also be performed, and a signal from the data server can be received in the power-saving mode even in a state of being parked, that is, in a state where ignition is OFF. In a case where there is a vehicle response request from the data server, in a state of the power-saving mode, it is determined whether or not the vehicle response request is a vehicle response request addressed to a host vehicle, and in a case where it is determined the vehicle response request is the vehicle response request addressed to the host vehicle, an update permission response is transmitted to the data server, and the on-vehicle control device is transitioned to the normal mode. In addition, the transition to the normal mode described above is performed only at the time of having a battery residual amount where the information can be written.

Advantageous Effects of Invention

According to the present invention, in the information update of the on-vehicle control device, it is possible for the data server to specify a subject vehicle or a subject on-vehicle control device in a state where the update can be performed without waking up the vehicle in a state of being parked. In addition, it is possible to avoid a concern that update information is not capable of being normally received or updated due to an insufficient battery residual amount, in advance.

BRIEF DESCRIPTION OF DRAWINGS

FIG. 2 is a diagram illustrating an example of vehicle management data of a data server illustrated in FIG. 1.

FIG. 8 is a diagram illustrating an example of management information stored in the on-vehicle control device 11 according to the present invention.

DESCRIPTION OF EMBODIMENTS

Hereinafter an example of the present invention will be described by using the drawings.

Example 1

Figure 1:
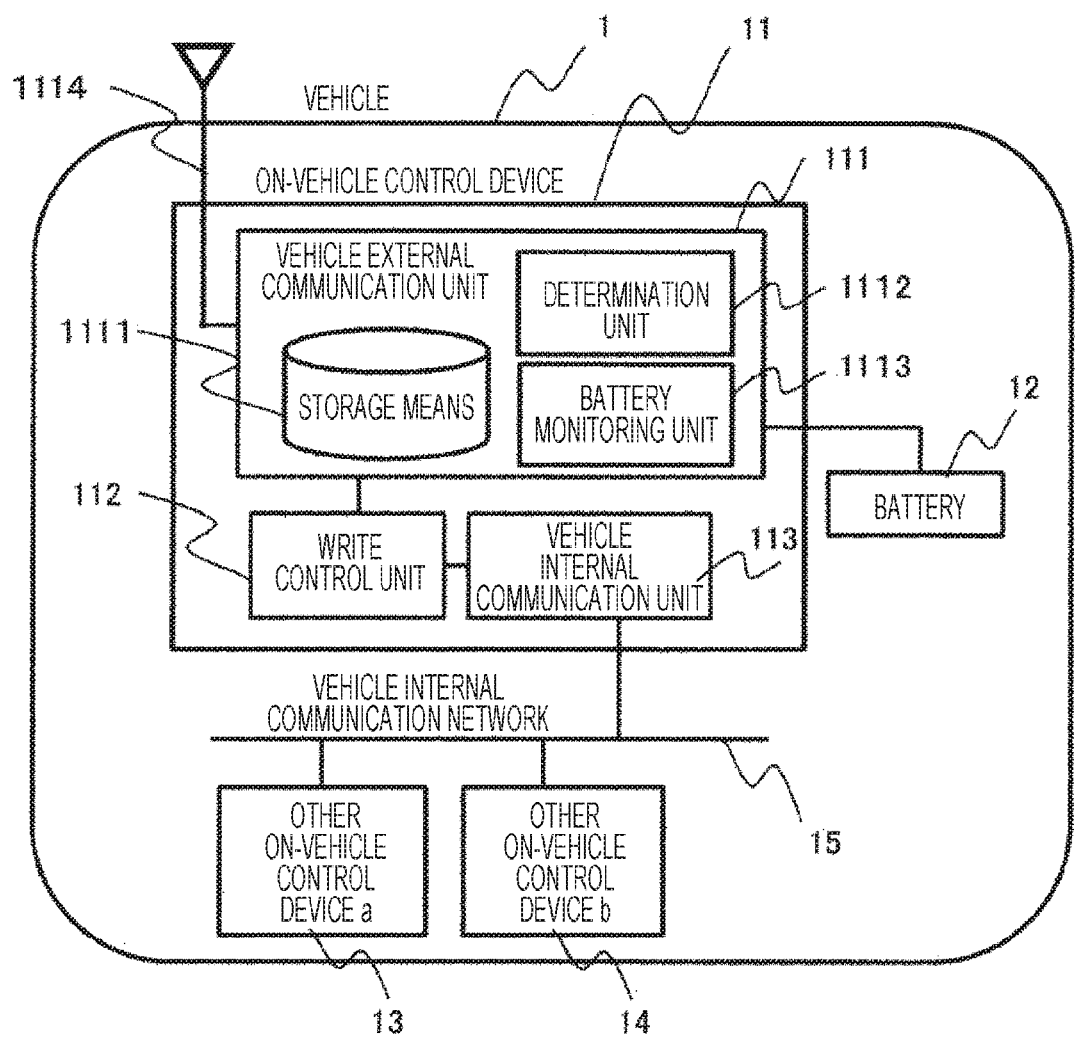
FIG. 1 is a configuration diagram of an information update system according to an example.

FIG. 1 is a configuration diagram of an on-vehicle control device information update system according to an example of the present invention.

The information update system of this example includes a vehicle 1 and a data server 2, and wireless two-way communication between the vehicle 1 and the data server 2 is performed through an internet line 3 and a base station 4. Furthermore, in FIG. 1, only one vehicle 1 is illustrated, but in practice, a plurality of vehicles 1 are connected to the data server.

The wireless communication, for example, is performed by a public line such as 3G/LTE, through a line such as a mobile telephone network or WiFi.

The vehicle 1 is configured of an on-vehicle control device 11, other on-vehicle control devices a13 and b14, and a battery 12. Such constituents are connected to each other through a vehicle internal communication network 15 such as a controller area network (CAN), a local interconnect network (LIN), such that two-way data communication can be performed.

The on-vehicle control device 11 includes a vehicle external communication unit 111, a write control unit 112, and a vehicle internal communication unit 113, delivers update information received from the data server 2 to the own device and the other on-vehicle control devices a13 and b14 connected through the vehicle internal communication network 15, and updates the information. Further, the vehicle external communication unit 111 includes a storage means 1111, a determination unit 1112, a battery monitoring unit 1113, and a wireless antenna 1114.

In addition, even though it is not illustrated in FIG. 1, each constituent in the vehicle, such as the on-vehicle control device, is connected to the battery 12 through a power line, and is supplied with power.

The data server 2 includes a server 21 and a control unit 22. Management information or user information of a plurality of vehicles, which are a management subject, area information, and the like are registered in advance in the server 21, and are compiled in a database for each vehicle such that a vehicle can be searched and extracted in a case where an update event of information occurs.

An example of vehicle management data managed in the database of the managing server 21 is illustrated in FIG. 2. The vehicle management data is intrinsic information for each of the vehicles, and includes the type of vehicle or a model, a management number for uniquely identifying a vehicle, management number or a software version of an on-vehicle control device to be mounted on each vehicle, user information or area information linked to a vehicle, update history information, and the like. Furthermore, in FIG. 2, management data of one vehicle is illustrated, in practice, the management data is configured of management data of a plurality of vehicles managed by the data server.

In this configuration, in a case where the update event of the information occurs, first, the data server 2 specifies the vehicle and the on-vehicle control device, which are an update subject, update information is delivered to the vehicle which can be specified, and information is updated to other on-vehicle control devices, which are the update subject, through the on-vehicle control device 11.

Figure 3:
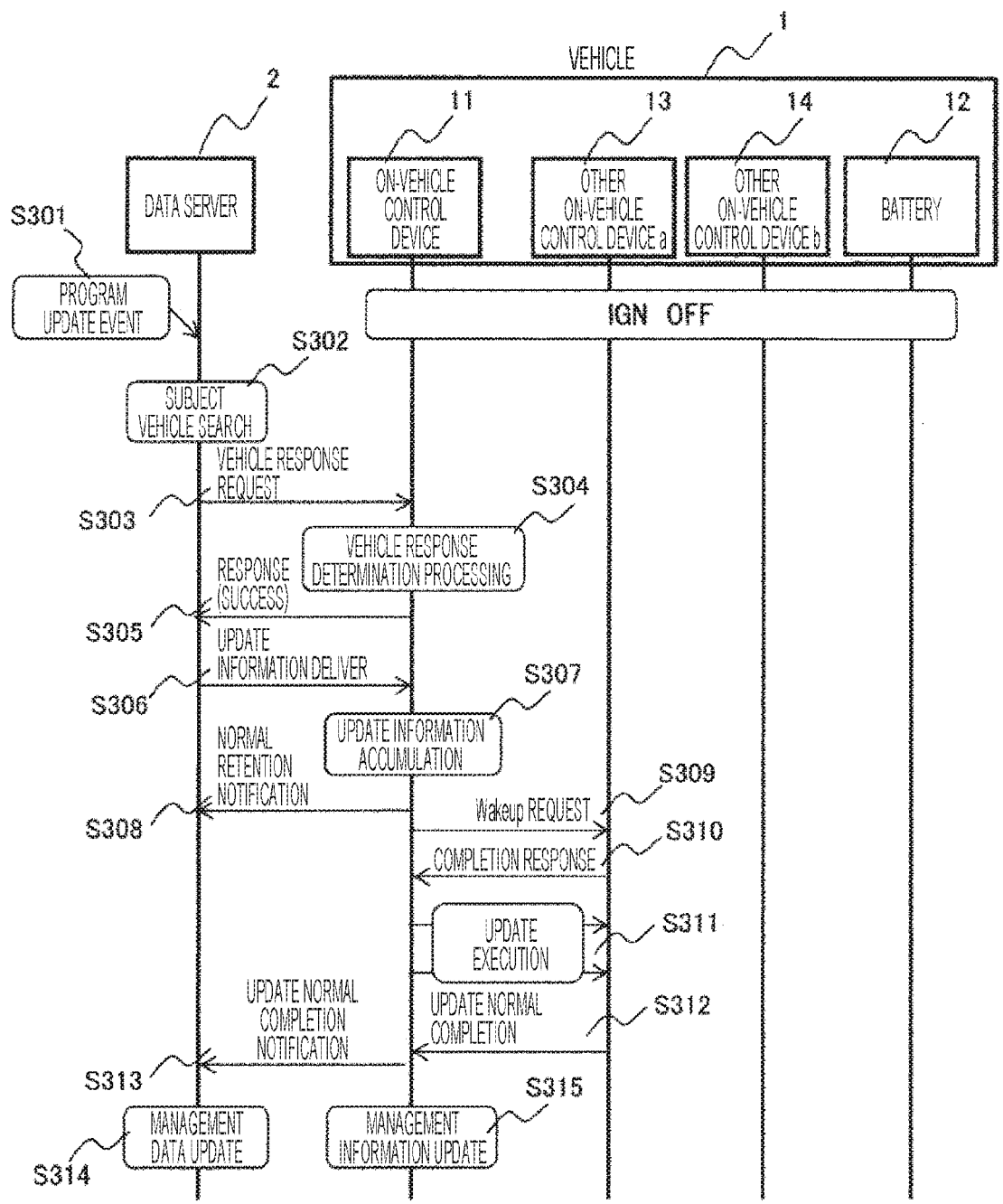
FIG. 3 is diagram illustrating a data communication sequence between a vehicle 1 and a data server 2 according to the example.

Next, the outline of a data communication sequence for information update of the vehicle 1 and the data server 2 is illustrated in FIG. 3. The data server 2, the on-vehicle control device 11, the other on-vehicle control devices a13 and b14, and the battery are used as each node of the communication sequence. Among them, the on-vehicle control device 11, other on-vehicle control devices a13 and b14, and the batteries are included in the vehicle 1, and perform wireless two-way communication with respect to the data server 2. In this example, a case where program update of the other on-vehicle control device a13 is requested will be described as an example.

First, in a case where a program update event occurs (S301), the data server 2 searches the vehicle, which is the update subject, on the basis of the vehicle management data collectively managed by the server 21 (S302). Next, the data server transmits a vehicle response request message to all of the searched subject vehicles (S303). The on-vehicle control device 11, which receives the vehicle response request message, performs vehicle response determination processing (S304), and transmits a response message according to a determination result to the data server (S305). The details of the vehicle response determination processing (S304) will be described below.

The data server 2, which receives the response message with respect to a vehicle response request from the vehicle 1 (S305), checks the determination result included in the response message, and in a case where the result is "Specific Success", delivers an update program of the other on-vehicle control device a13, which is the update subject, to the vehicle 1 (S306). The delivered update program is accumulated in the on-vehicle control device 11 (S307), and in a case where the update program is capable of being normally retained, the effect is notified to the data server (S308). Next, the on-vehicle control device 11 transmits a Wakeup request through the vehicle internal communication network 15 in order to activate the other on-vehicle control device a13, which is the update subject (S309). In a case where the activation of the other on-vehicle control device a13, which receives a Wakeup signal, is completed, the effect is transmitted to the on-vehicle control device 11 (S310). After that, the on-vehicle control device 11 updates the program of the other on-vehicle control device a13 (S311). In a case where the update of the program is normally completed, the on-vehicle control device 11 notifies the effect to the data server 2 (S313). Finally, the on-vehicle control device 11 and the data server 2 update the management data (S314 and S315).

Figure 4:
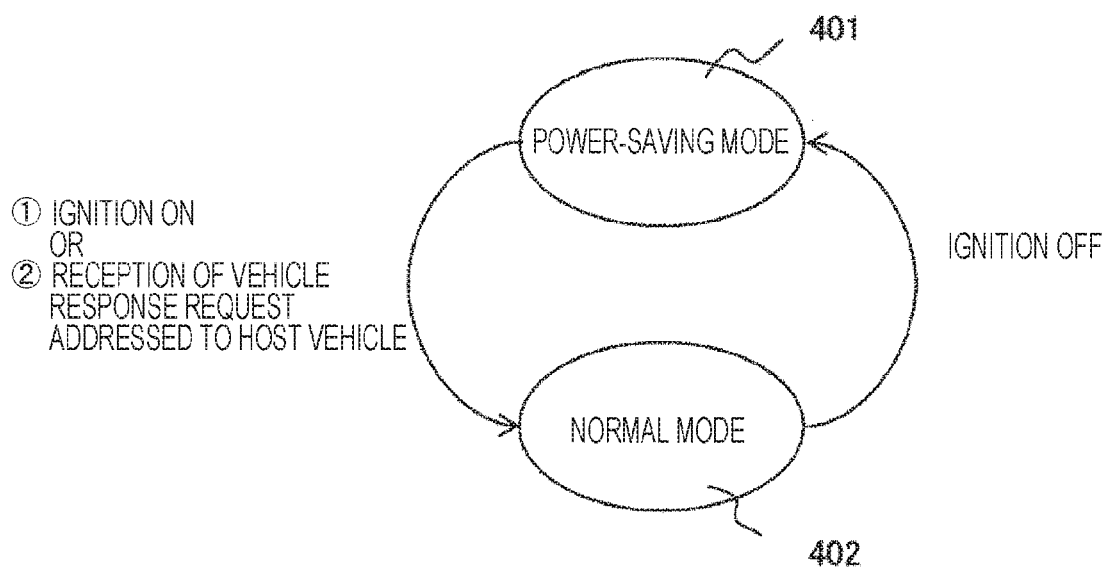
FIG. 4 is a diagram illustrating a mode transition of an on-vehicle control device 11 according to the present invention.

Next, FIG. 4 illustrates an operation mode of the on-vehicle control device 11 according to the present invention. The on-vehicle control device 11 includes two operation modes. One of the operation modes is a power-saving mode 401 where only the vehicle external communication unit can be operated, and the other operation mode is a normal mode 402 where units other than the vehicle external communication unit can also be operated. In a case where the ignition of the vehicle is OFF, the on-vehicle control device 11 is transitioned to the power-saving mode 401, and thus, it is possible to perform only the communication with respect to the data server. In addition, in the power-saving mode, in a case where the ignition of the vehicle is ON, or the vehicle response request addressed to the host vehicle is received, the on-vehicle control device is transitioned to the normal mode 402, and thus, a state is obtained where communication with respect to the other on-vehicle control devices connected through the vehicle internal communication network 15 can also be performed in addition to the communication with respect to the data server.

Figure 5:
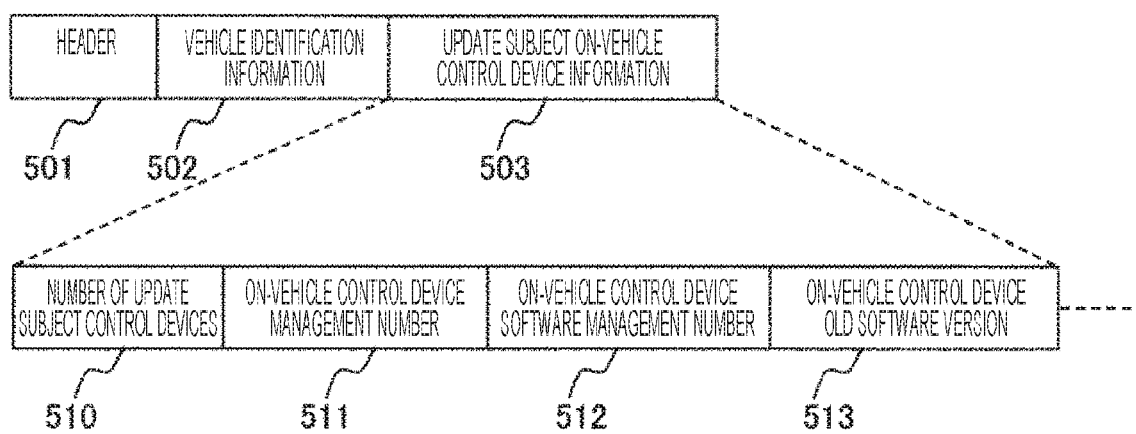
FIG. 5 is a diagram illustrating an example of a transmission message of a vehicle response request illustrated in FIG. 3.

Next, FIG. 5 illustrates an example of the vehicle response request message which is transmitted from the data server 2 when information update event occurs. The vehicle response request message is configured of a header 501, vehicle identification information 502, and update subject on-vehicle control device information 503. Further, the update subject on-vehicle control device information 503 is configured of the number of update subject control devices 510, an on-vehicle control device management number 511, an on-vehicle control device software management number 512, and an on-vehicle control device old software version 513. Furthermore, in a case where there are a plurality of on-vehicle control devices, which are the update subject, each on-vehicle control device information item is stored in the update subject on-vehicle control device information 503 in the order.

Figure 6:
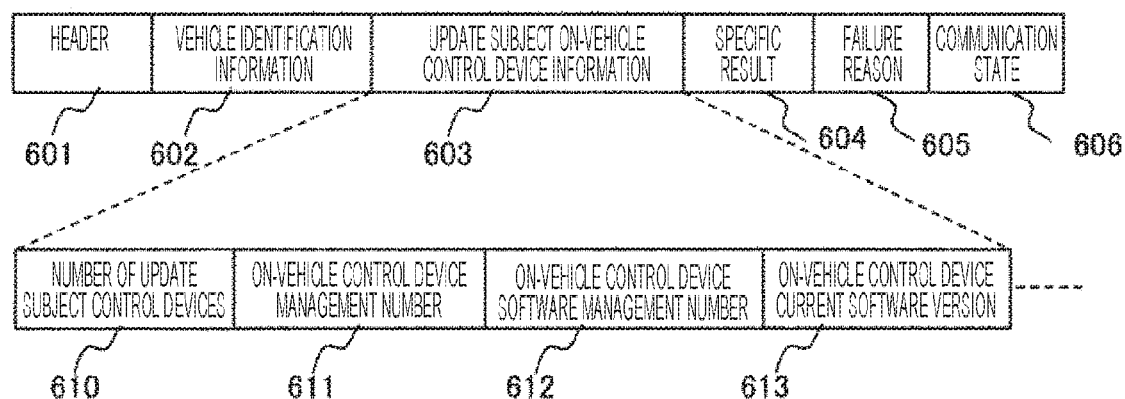
FIG. 6 is a diagram illustrating an example of a response message with respect to the vehicle response request illustrated in FIG. 3.

FIG. 6 illustrates an example of a response message which is transmitted from the vehicle to the data server, with respect to the vehicle response request message. This response message is configured of a header 601, vehicle identification information 602, update subject on-vehicle control device information 603, a specific result 604, a failure reason 605, and a communication state 606. Further, the update subject on-vehicle control device information 603 is configured of the number of update subject control devices 610, an on-vehicle control device management number 611, an on-vehicle control device software management number 612, and an on-vehicle control device current software version 613. The determination result of the vehicle response determination processing S304 in the on-vehicle control device 11 ("Specific Success"/"Specific Failure") are stored in the specific result 604. In addition, the reason in a case where the specific result is "Failure" is stored in the failure reason 605. In addition, the communication state 606 stores a radio wave state (intensity) received from the wireless antenna 1114 of the vehicle external communication unit 111. Furthermore, in a case where there is a plurality of on-vehicle control devices, which are the update subject, each on-vehicle control device information is stored in the update subject on-vehicle control device information 603 in the order.

Figure 7:
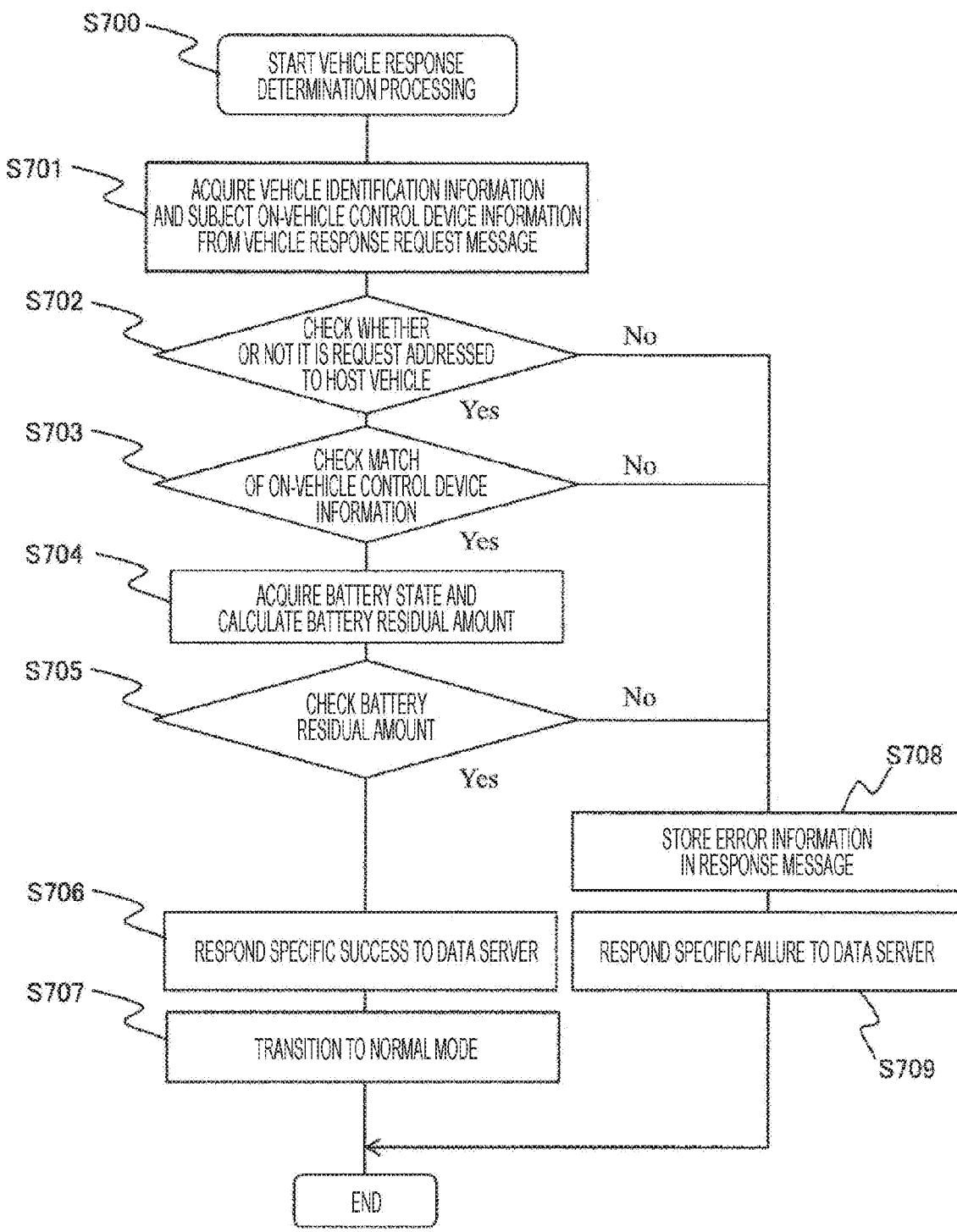
FIG. 7 is an operation flowchart of vehicle response determination processing of the on-vehicle control device 11 according to the present invention.

FIG. 7 is an operation flow of the vehicle response determination processing S304 which is executed when the on-vehicle control device 11 according to the present invention receives the vehicle response request from the data server. Hereinafter, each step of FIG. 7 will be described.

(FIG. 7: Step S700)

In a case where the vehicle response request is received from the data server 2, the vehicle external communication unit 111 of the on-vehicle control device 11 starts this flowchart, and performs the vehicle response determination processing S304.

(FIG. 7: Step S701)

The vehicle external communication unit 111 acquires the vehicle identification information 502 and the update subject on-vehicle control device information 503 from the vehicle response request message received from the data server 2, through the wireless antenna 1114.

(FIG. 7: Step S702)

The vehicle external communication unit 111 compares the vehicle identification information 502 acquired in S701 with the on-vehicle identification information in the management information stored in advance in the storage means 1111 by the determination unit 1112, and determines whether or not the request is a request addressed to the host vehicle. As a result of the determination, in a case where the request is the request addressed to the host vehicle, the process proceeds to Step S702. In a case where the request is not the request addressed to the host vehicle, the process proceeds to Step S708. Furthermore, the details of the management information stored in the storage means 1111 will be described below.

(FIG. 7: Step S703)

The vehicle external communication unit 111 compares the on-vehicle control device management number 511, the on-vehicle control device software management number 512, and the on-vehicle control device old software version 513, stored in the update subject on-vehicle control device information 503 acquired in S701, with the management number or the software version of the on-vehicle control device information in the management information stored in advance in the storage means 1111 by the determination unit 1112, and determines whether or not the on-vehicle control device, which is the update subject, is correct. As a result of the determination, in a case where the subject on-vehicle control device is matched, the process proceeds to Step S704. In a case where the subject on-vehicle control device is not matched, the process proceeds to Step S708. Furthermore, the details of the management information stored in the storage means 1111 will be described below.

(FIG. 7: Steps S704 and S705)

The vehicle external communication unit 111 acquires the state of the battery 12 by the battery monitoring unit 1113, and calculates a current battery residual amount (S704). The vehicle external communication unit 111 determines whether or not the calculated battery residual amount is capacitance necessary for downloading or updating the update information, by the determination unit 1112 (S705). As a result of the determination, in the case of having the residual amount, the process proceeds to Step S706. In the case of not having the residual amount, the process proceeds to Step S708. The acquirement processing of the state of the battery will be described below. Furthermore, the acquirement processing of the state of the battery may be performed in advance before the vehicle response request is received.

(FIG. 7: Steps S706 and S707)

The vehicle external communication unit 111 stores "Success" in the specific result 504 of the response message, and transmits the response message to the data server 2 from the wireless antenna 1114 (S706). Then, the mode of the vehicle external communication unit 111 is transitioned to the normal mode from the power-saving mode (S707). A configuration example of the response message is illustrated in FIG. 6.

(FIG. 7: Steps S708 and S709)

The vehicle external communication unit 111 stores "Failure" and "Failure Reason" in each of the specific result 604 and the failure reason 605 of the response message, and transmits the response to the data server from the wireless antenna 1114 (S709).

FIG. 8 illustrates an example of the management information of the on-vehicle control device to be mounted on the host vehicle, which is stored in the storage means 1111 of the vehicle external communication unit 111 by the on-vehicle control device 11 according to the present invention. The management information is configured of vehicle identification information for uniquely identifying a vehicle, vehicle internal communication network IDs (here, CAN IDs) of all of the on-vehicle control devices to be mounted, a management number, a software management number, a software version, or the like.

Such management information may be stored in the storage means 1111 at the time of manufacturing the vehicle, or each of the information items may be collected in advance with respect to the other on-vehicle control devices connected through the vehicle internal communication network 15, by using the on-vehicle control device 11 as a trigger after the vehicle is manufactured.

Figure 9:
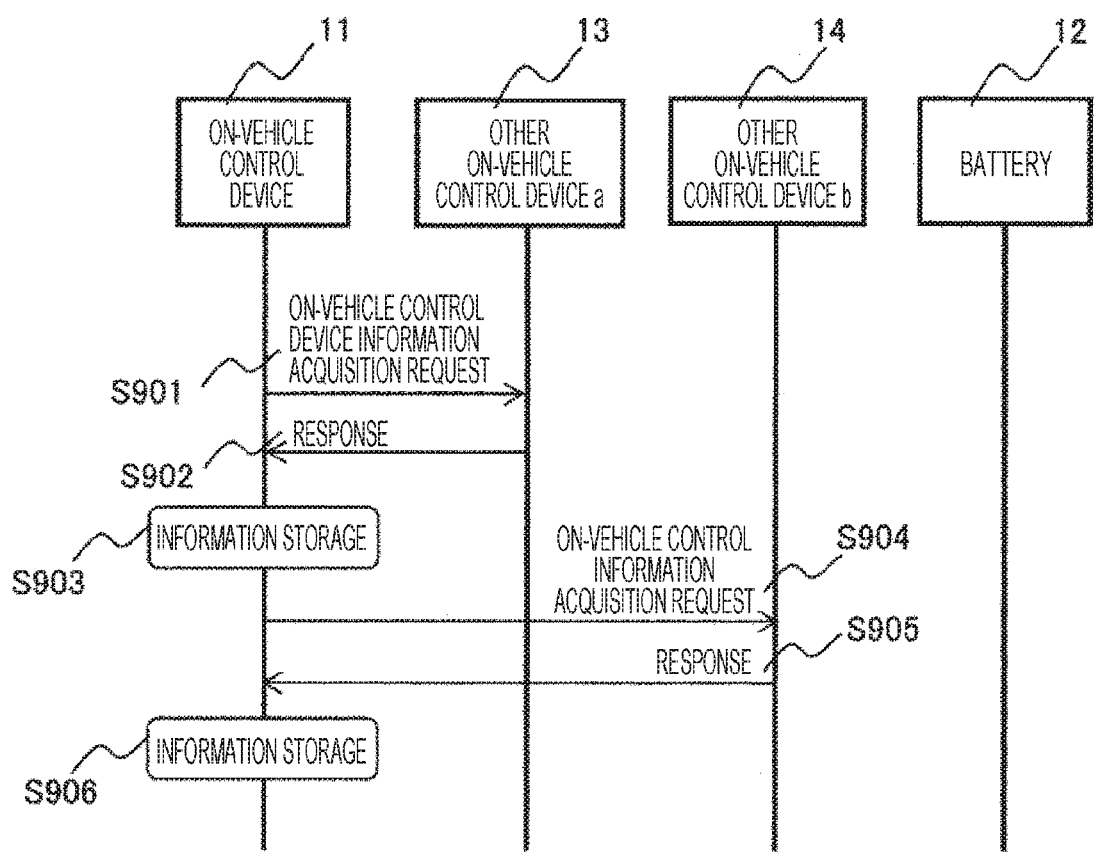
FIG. 9 is a diagram illustrating an example of a communication sequence when the on-vehicle control device 11 according to the present invention collects management information of a host vehicle illustrated in FIG. 8.

FIG. 9 illustrates a sequence example when the on-vehicle control device 11 according to the present invention acquires the management information of the on-vehicle control device of the host vehicle. The write control unit 112 of the on-vehicle control device 11 transmits an on-vehicle control device information acquirement request to the other on-vehicle control device a13 through the vehicle internal communication unit 113 (S901). In a case where the on-vehicle control device information acquirement request is received, the other on-vehicle control device a13 returns a response in which the own management information is set, to the on-vehicle control device 11 (S902). The on-vehicle control device 11 stores the received data in the storage means 1111 (S903).

Next, the write control unit 112 of the on-vehicle control device 11 transmits the on-vehicle control device information acquirement request to the other on-vehicle control device b14 through the vehicle internal communication unit 113 (S904). In case where the on-vehicle control device information acquirement request is received, the other on-vehicle control device b14 returns a response in which the own management information is set, to the on-vehicle control device 11 (S905). The on-vehicle control device 11 stores the received data in the storage means 1111 (S906).

Figure 10:
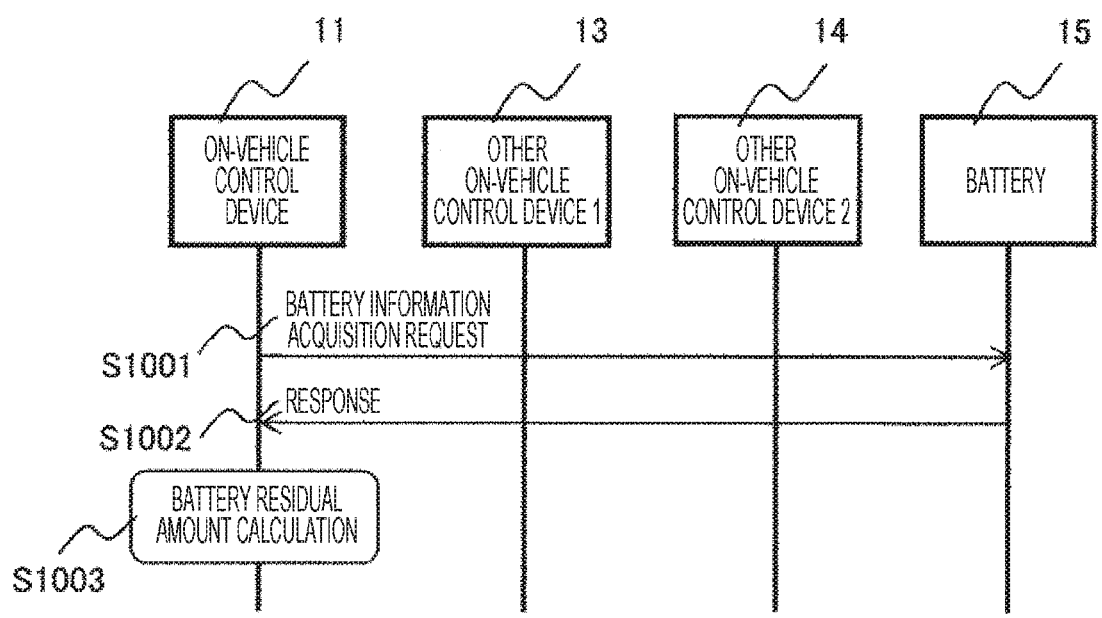
FIG. 10 is a diagram illustrating a sequence where the on-vehicle control device 11 according to the present invention collects information of a battery state.

FIG. 10 illustrates a sequence example when the on-vehicle control device 11 according to the present invention collects or updates the information of the battery state. The vehicle external communication unit 111 of the on-vehicle control device 11 transmits a battery state acquirement request to the battery 12 by the battery monitoring unit 1113 (S1001). In a case where the battery state acquirement request is received, the battery 12 returns a response in which the current battery state is set, to the on-vehicle control device 11 (S1002). The on-vehicle control device 11 calculates the battery residual amount from the received battery state (S1003).

Summary of Example

As described above, the on-vehicle control device 11 according to this example receives the vehicle response request message from the data server in the power-saving mode where only the vehicle external communication unit 111 can be operated, checks the vehicle identification information or the on-vehicle control device information of the update subject, which is stored in the message, and the vehicle identification information or the on-vehicle control device information, which is stored in advance in the vehicle external communication unit 111, and responds the result to the data server, and thus, it is possible to specify the vehicle, which is the update subject, or to specify the presence or absence of the on-vehicle control device, by a simple method without waking up the vehicle. In addition, in the same means, by checking the battery residual amount, it is possible to avoid a concern that update information is not capable of being normally received or updated due to an insufficient battery residual amount during updating information, in advance.

Modified Example of Example

The present invention is not limited to the example described above, but includes various modification examples. The example described above has been described in detail in order to easily explain the present invention, but it is not necessary to include all configurations described herein.

In the example described above, it has been described that the vehicle response determination processing is performed by the on-vehicle control device 11, but the vehicle response determination processing can be realized even in a case where the function is provided in the data server side.

REFERENCE SIGNS LIST

1 vehicle
2 data server
3 internet line
4 base station
11 on-vehicle control device
12 battery
13 other on-vehicle control device a
14 other on-vehicle control device b
15 vehicle internal communication network
21 server
22 control unit
111 vehicle external communication unit
112 write control unit
113 vehicle internal communication unit
1111 storage means
1112 determination unit
1113 battery monitoring unit.
1114 wireless antenna
401 power-saving mode
402 normal mode
501, 601 header
502, 602 vehicle identification information
503, 603 update subject on-vehicle control device information
510, 610 number of update subject control devices
511, 611 on-vehicle control device management number
512, 612 on-vehicle control device software management number
513 on-vehicle control device old software version
604 specific result
605 failure reason
606 communication state
613 on-vehicle control device current software version

The invention claimed is:

1. An on-vehicle control device transmitting and receiving information with respect to a data server outside a vehicle,
wherein the on-vehicle control device includes a power-saving mode in which only transmission and reception with respect to the data server is performed, and a normal mode in which communication with respect to other on-vehicle control devices is also performed,
in the power-saving mode, in the case of receiving a response request from the data server, it is determined whether or not the response request is a response request addressed to a host vehicle, and
in a case where it is determined that the response request is the response request addressed to the host vehicle, a success response is transmitted to the data server, and the on-vehicle control device is changed from the power-saving mode to the normal mode.

2. The on-vehicle control device according to claim 1, wherein the success response is transmitted to the data server in the case of having a battery residual amount in which the information is capable of being written.

3. The on-vehicle control device according to claim 1, wherein the success response is transmitted to the data server in a case where management information of an update subject on-vehicle control device stored in the response request and management information of other on-vehicle control devices stored in the on-vehicle control device are coincident with each other.

4. The on-vehicle control device according to claim 1, wherein the success response is transmitted to the data server, and the on-vehicle control device is transitioned to the normal mode, and then, a Wakeup request is transmitted to all of the on-vehicle control devices other than the update subject on-vehicle control device, which are connected through a vehicle internal communication network.

5. The on-vehicle control device according to claim 1, wherein the success response which is transmitted to the data server includes any one of vehicle identification information, the management information of the on-vehicle control device, and a determination result.

6. The on-vehicle control device according to claim 1, wherein a failure reason is stored in a failure response which is transmitted to the data server.

7. The on-vehicle control device according to claim 1, wherein the determination of whether or not the response request is the response request addressed to the host vehicle is performed by using a vehicle identification number.

8. The on-vehicle control device according to claim 3, wherein the management information of the other on-vehicle control devices is collected in advance from other on-vehicle control devices connected through a vehicle internal communication network.

9. The on-vehicle control device according to claim 1, wherein in the case of normally receiving update information from the data server, the update information is written with respect to the on-vehicle control device itself, or the other on-vehicle control devices connected through the vehicle internal communication network.

10. The on-vehicle control device according to claim 9, wherein in a case where the writing of the update information is normally ended, the effect that update is normally completed is notified to the data server.

11. The on-vehicle control device according to claim 9, wherein in a case where the writing of the update information is normally ended, an electric device of the vehicle is controlled.

12. An on-vehicle control device information update system transmitting a response request to the on-vehicle control device according to claim 1,
wherein in a case where an update event of information occurs, a response request including vehicle identification information is transmitted to the vehicle from the data server, and
a vehicle in a state in which the information is capable of being updated is specified on the basis of a response with respect to the response request from the vehicle.

13. The on-vehicle control device information update system according to claim 12,
wherein the data server includes a vehicle management database in which specific area information and vehicle identification information of a vehicle in an area represented by the area information are linked to each other.

14. The on-vehicle control device information update system according to claim 13,
wherein the data server includes a vehicle management database in which management information of the on-vehicle control device of the vehicle and the vehicle identification information of the vehicle are linked to each other.

15. The on-vehicle control device information update system according to claim 11,
wherein in a case where the response with respect to the response request from the vehicle is a success response, update information is delivered to a subject vehicle.

16. The on-vehicle control device information update system according to claim 11,
wherein in the case of receiving a notification to the effect that information update from the vehicle is normally ended, the data server updates the management information of the on-vehicle control device of the vehicle management database to the latest information.

17. The on-vehicle control device information update system according to claim 11,
wherein in a case where a wireless communication state stored in the response with respect to the response request from the vehicle is less than or equal to a predetermined value, the update information is not delivered to the subject vehicle.

18. The on-vehicle control device according to claim 1, further comprising an external communication unit configured to compare an on-vehicle control device management number, an on-vehicle control device software management number, and an on-vehicle control device old software version, stored in an update subject on-vehicle control device information, with a management number or the software version of the on-vehicle control device information in the management information stored in advance in a storage means by a determination unit, and determines whether or not the on-vehicle control device, which is the update subject, is correct.

* * * * *